United States Patent
Nishimura

(10) Patent No.: US 12,377,501 B2
(45) Date of Patent: Aug. 5, 2025

(54) SOLDER PREFORM CONTAINING Cu—Co PARTICLES

(71) Applicant: NIHON SUPERIOR CO., LTD., Osaka (JP)

(72) Inventor: Tetsuro Nishimura, Osaka (JP)

(73) Assignee: NIHON SUPERIOR CO., LTD., Osaka (JP)

( * ) Notice: Subject to any disclaimer, the term of this patent is extended or adjusted under 35 U.S.C. 154(b) by 228 days.

(21) Appl. No.: 17/630,061

(22) PCT Filed: Jul. 22, 2020

(86) PCT No.: PCT/JP2020/028578
§ 371 (c)(1),
(2) Date: Jan. 25, 2022

(87) PCT Pub. No.: WO2021/020309
PCT Pub. Date: Feb. 4, 2021

(65) Prior Publication Data
US 2022/0274212 A1 Sep. 1, 2022

(30) Foreign Application Priority Data
Jul. 26, 2019 (JP) .................... 2019-138325

(51) Int. Cl.
*B23K 35/30* (2006.01)
*B23K 35/26* (2006.01)
*C22C 9/06* (2006.01)

(52) U.S. Cl.
CPC .......... *B23K 35/302* (2013.01); *B23K 35/262* (2013.01); *C22C 9/06* (2013.01)

(58) Field of Classification Search
CPC .............................................. B23K 35/0244
See application file for complete search history.

(56) References Cited

U.S. PATENT DOCUMENTS

2005/0029666 A1 2/2005 Kurihara et al.
2009/0236725 A1 9/2009 Hirano et al.
(Continued)

FOREIGN PATENT DOCUMENTS

CN 103805795 B * 9/2015
CN 106660177 A 5/2017
(Continued)

OTHER PUBLICATIONS

Mayappan et al. "The effect of Ni addition in SnAgCu solder on microhardness and intermetallic formation", 3rd International Sciences, Technology & Engineering Conference (ISTEC) 2018—Material Chemistry AIP Conf. Proc. 2031, 020005-1-020005-6; https://doi.org/10.1063/1.5066961 (Year: 2018).*

(Continued)

*Primary Examiner* — Keith Walker
*Assistant Examiner* — Carlos J Gamino
(74) *Attorney, Agent, or Firm* — Fitch, Even, Tabin & Flannery LLP

(57) ABSTRACT

Provided is a preformed solder including a lead-free solder mainly composed of Sn and a metal particle with a melting point higher than a melting point of the lead-free solder. The metal particle is formed of a Cu—Ni alloy having a Ni content of 0.1 to 90% by mass, or a Cu—Co alloy having a Co content of 0.1 to 90% by mass, and the lead-free solder may contain Ni when the metal particle is formed of the Cu—Ni alloy, or contains Ni when the metal particle is formed of the Cu—Co alloy, and (Cu,Ni)6Sn5 is formed on a surface of the metal particle. With this preformed solder, a bonded portion having heat resistance, thermal conductivity, and reliability higher than ever can be formed.

3 Claims, 3 Drawing Sheets

(56) References Cited

U.S. PATENT DOCUMENTS

| | | |
|---|---|---|
| 2013/0233618 A1 | 9/2013 | Nakano et al. |
| 2013/0270001 A1* | 10/2013 | Nakano .................. C22C 22/00 174/84 R |
| 2013/0299236 A1* | 11/2013 | Nakano .............. B23K 35/0238 228/249 |
| 2015/0072165 A1* | 3/2015 | Sunaga .................... C25D 3/56 205/95 |
| 2017/0095891 A1 | 4/2017 | Anderson et al. |
| 2017/0173739 A1 | 6/2017 | Kawaguchi |
| 2018/0126494 A1 | 5/2018 | Washizuka |
| 2018/0297152 A1 | 10/2018 | Noguchi |
| 2019/0001444 A1* | 1/2019 | Kawaguchi ............. B22F 7/064 |
| 2019/0019594 A1* | 1/2019 | Ishii ........................ B22F 1/102 |
| 2020/0013673 A1* | 1/2020 | Zierath ............. H01L 23/53233 |

FOREIGN PATENT DOCUMENTS

| | | | |
|---|---|---|---|
| JP | 2005-161338 A | 6/2005 | |
| JP | 5369682 B2 | 12/2013 | |
| WO | 03/021664 A1 | 3/2003 | |
| WO | 2012/066795 A1 | 5/2012 | |
| WO | WO-2015079844 A1 * | 6/2015 | .......... B23K 1/0008 |
| WO | 2017/134974 A1 | 8/2017 | |

OTHER PUBLICATIONS

CNIPA; Application No. 202080054107.8; Office Action dated Nov. 3, 2022.

EPO; Application No. 20848566.4; Extended European Search Report dated Jun. 27, 2023.

* cited by examiner

SOLDER PREFORM CONTAINING Cu—Co PARTICLES

CROSS-REFERENCE TO RELATED APPLICATIONS

This application is a U.S. national phase application filed under 35 U.S.C. § 371 of International Application No. PCT/JP2020/028578, filed Jul. 22, 2020 which is based upon and claims the benefit of priority from the prior Japanese Application No. 2019-138325, filed Jul. 26, 2019.

FIELD

The present invention relates to a preformed solder and a solder bonded body formed by using the preformed solder.

BACKGROUND

In the past, for example, when an electronic part such as a power conversion element is fixed to a copper substrate, the method is sometimes employed in which a solder paste or a solder sheet is disposed in a necessary position followed by soldering it by heating with a reflow furnace or the like. In the soldering method using the reflow method like this, the solder that is melted by heating is pushed out from between the members to be bonded due to the own weight of the electronic part or the like, thereby sometimes resulting in a decrease in the bonding strength. In addition, when an electronic part is bonded to a wiring substrate by a solder bump, the bump's height can be irregular thereby bonding the electronic part to the substrate slantingly. When bonded in this way, the part where the bump height is low receives a thermal stress as a result of long use, thereby sometimes resulting in a crack or the like in the bump. In addition to the failure occurred at the time of soldering, under the condition in which a solder bonded portion of the electronic part is exposed to a high temperature when working at a high temperature, the solder bonded portion becomes soft (hardness and strength are decreased as compared with normal temperature), so that the height of the solder bonded portion changes to be irregular due to the own weight of the bonding part or due to an outer force such as vibration, thereby sometimes resulting in poor bonding.

To address these problems, for example, a composite material having metal particles dispersed in a solder alloy has been proposed (Patent Literatures 1 to 3).

Patent Literature 1 discloses the lead-free formed solder that is mainly composed of Sn and has high-melting point metal particles dispersed in a plate-like solder, in which the metal particles are formed of Ni or Cu, the melting point thereof is higher than the melting point of the solder alloy by 300° C. or more, the particle diameter thereof is in the range of 20 to 300 µm, a fluctuation of the particle diameter of the high-melting point metal particles is within 40% of the particle diameter thereof, a metal alloy layer formed of the main solder component and the high-melting point metal particles is formed around the high-melting point metal particles, and the metal alloy layer is at least one metal alloy layer selected from the group consisting of $Ni_3Sn$, $Ni_3Sn_2$, and $Ni_3Sn_4$ when the metal particles are formed of Ni, and from the group consisting of $Cu_3Sn$ and $Cu_6Sn_5$ when the metal particles are formed of Cu. It is described that when a semiconductor element is soldered with a substrate on the basis of the composition as described above, because the semiconductor element and the substrate are not bonded slantingly, there is no decrease in the bonding strength due to a shortage of the solder amount, and because a metal alloy layer with the solder is formed around the metal particles, the bonding strength with the metal particles is increased.

Patent Literature 2 discloses the solder sheet that has metal balls with a melting point higher than the solder that forms a matrix, dispersed therein, in which the average value of the diameter of the metal balls is in the range of 30 to 300 µm, and a standard deviation of the diameter distribution is 2.0 µm or less. It is described that because the composition like this can properly keep the distance between the substrate's electrode portion and the electronic part's terminal (stand-off height), the thickness of the solder layer that disturbs thermal conduction can be thinned, and the stand-off height can be reduced as much as possible in the region where the thermal expansion difference between the substrate and the electronic member is relaxed.

Patent Literature 3 discloses a semiconductor device in which a solder layer having a chip part and a wiring member bonded is sealed with a resin, and in which the solder layer is formed of a composite body having metal powders dispersed in a matrix metal, the melting point of the metal powders being higher than the matrix metal. It is described that the composition like this can provide the semiconductor device in which a chip part as a circuit element is mounted on a substrate, and when the semiconductor device having the mounted chip member sealed with a resin is mounted on an outer wiring substrate, running-out of a first mounted solder material, as well as short circuit or breakage of the wiring, or misalignment of the chip member due to the running-out, can be prevented.

CITATION LIST

Patent Literature

Patent Literature 1: Japanese Patent No. 5369682
Patent Literature 2: Japanese Patent Application Laid-open No. 2005-161338
Patent Literature 3: WO2003/021664

SUMMARY

In recent years, a SiC semiconductor is receiving an attention because this can work at a higher temperature than a Si semiconductor. Accordingly, in the solder alloy in which, for example, a power module or the like using the SiC semiconductor is bonded onto a substrate, heat resistance, thermal conductivity, and reliability higher than ever are increasingly required. In addition, because the fifth-generation communication technology is realized, massive data are exchanged between communication terminals; thus, in the solder alloy that is used in the bonded portion between the printed substrate of a communication terminal and the terminal of an electronic part, too, heat resistance, thermal conductivity, and reliability higher than ever are increasingly required.

The inventor of the present invention carried out an extensive investigation on the solder alloy having high heat resistance, thermal conductivity, and reliability; and as a result, it was found that depositing an intermetallic compound in the solder alloy was effective as the solder alloy that can have these characteristics (Japanese Patent Application Laid-open No. 2011-41970). The solder alloy like this can satisfy the market requirements to a certain degree, but there still remains a room for improvement.

In the invention described in Patent Literature 1, it is described that the high-melting point metal particles are formed of Ni or Cu, and the metal alloy layer between the metal particles and Sn, which is a main component of the solder, is at least one metal alloy selected from the group consisting of $Ni_3Sn$, $Ni_3Sn_2$, and $Ni_3Sn_4$, or from the group consisting of $Cu_3Sn$ and $Cu_6Sn_5$. However, according to the investigation by the inventor of the present invention, for example, when the metal particles are formed of Ni, the wetting property thereof to a lead-free solder alloy mainly composed of Sn is so low that there is a possibility that the metal alloy layer is not satisfactorily formed.

In the invention described in Patent Literature 2, a metal ball mainly composed of Ni is used as the preferable metal ball. However, Patent Literature 2 discloses only a solder sheet formed with rolling the solder bands that is thinly rolled in advance, with simultaneously charging the metal balls between these bands; therefore, there is no intermetallic compound present in the solder sheet thus obtained. In addition, Patent Literature 2 discloses only the sheet that is formed by using a pure Ni metal piece as the metal ball mainly composed of Ni. Furthermore, as described before, the metal ball formed of Ni has a poor wetting property to the lead-free solder alloy mainly composed of Sn, so that there is a possibility that the intermetallic compound is not satisfactorily formed.

In the invention described in Patent Literature 3, the solder layer composed of a composite body, which has metal powders formed of various metal alloys dispersed in the matrix metal formed of various solder alloys including a lead-free solder alloy, is disclosed in Example. However, Patent Literature 3 does not pay attention to the intermetallic compound, although the sheet-like solder material formed of a solder alloy and metal powders is disclosed. In addition, in the metal powder clearly indicated in Patent Literature 3, there still remains a room for improvement in order to satisfy high performance requirements from the market.

Accordingly, an object of the present invention is to provide a preformed solder capable of forming a solder bonded portion having heat resistance, thermal conductivity, and reliability higher than ever. In addition, the present invention has an object to provide a solder bonded body having the solder bonded portion as described above.

The inventor of the present invention carried out an extensive investigation to solve the problems described above. As a result, it was found that the problems described above could be solved when a metal particle of a prescribed Cu—Ni alloy is made to present in a lead-free solder alloy (for example, a sheet-like lead-free metal alloy) mainly composed of Sn, or when a metal particle of a prescribed Cu—Co alloy is made to present in a lead-free solder alloy (for example, a sheet-like lead-free metal alloy) composed of mainly Sn and containing Ni.

The present invention relates to a preformed solder including a lead-free solder mainly composed of Sn and a metal particle with a melting point higher than a melting point of the lead-free solder, in which the metal particle is formed of a Cu—Ni alloy having a Ni content of 0.1 to 90% by mass, or a Cu—Co alloy having a Co content of 0.1 to 90% by mass, the lead-free solder may contain Ni when the metal particle is formed of the Cu—Ni alloy, or contains Ni when the metal particle is formed of the Cu—Co alloy, and $(Cu,Ni)_6Sn_5$ is formed on a surface of the metal particle. The present invention also relates to a solder bonded body formed by using the preformed solder described above.

The preformed solder according to the present invention is capable of forming the solder bonded portion having heat resistance, thermal conductivity, and reliability higher than ever. In addition, the solder bonded body having the solder bonded portion as described above can be provided.

DESCRIPTION OF EMBODIMENTS

Figure 1:
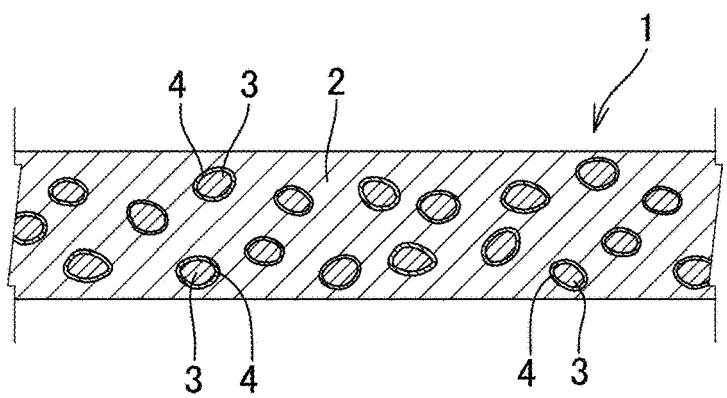
FIG. 1 is a sectional view in the thickness direction in order to explain the inner structure of the sheet-like preformed solder according to the embodiment.

The preformed solder according to the present invention includes, in a lead-free solder, a metal particle having the melting point thereof higher than that of the lead-free solder (hereinafter, this metal particle is sometimes called simply "metal particle"). This lead-free solder is the metal alloy that is mainly composed of Sn. The metal particle is formed of the Cu—Ni alloy whose Ni content is in the range of 0.1 to 90% by mass, or formed of the Cu—Co alloy whose Co content is in the range of 0.1 to 90% by mass. The lead-free solder may include Ni when the metal particle is formed of the Cu—Ni alloy, or includes Ni when the metal particle is formed of the Cu—Co alloy. Also, on the surface of the metal particle is formed $(Cu,Ni)_6Sn_5$, which is the intermetallic compound of the solder alloy with the metal particle.

Because $(Cu,Ni)_6Sn_5$ is formed on the surface of the metal particle in the preformed solder as mentioned above, due to the excellent thermal conductivity that is possessed by $(Cu,Ni)_6Sn_6$, the thermal conductivity of the solder bonded portion is excellent as well. When the metal particle is formed of the Cu—Ni alloy whose Ni content is within the prescribed range, Sn in the solder alloy can be dispersed into the metal particle more rapidly than the particle of Cu or Ni, so that $(Cu,Ni)_6Sn_5$ is formed very quickly. In the case that the metal particle is formed of the Cu—Co alloy whose Co content is within the prescribed range, too, it is presumed that $(Cu,Ni)_6Sn_5$ is formed very quickly because Co has the property similar to Ni. Especially when the metal particle is present in the solder alloy, $(Cu,Ni)_6Sn_5$ is formed more quickly with the metal particle serving as the nucleus. Because $(Cu,Ni)_6Sn_5$ with a melting point higher than the solder alloy is formed quickly on the surface of the metal particle, the size of the particle having the metal particle as the nucleus can be retained even when Cu is included therein. Therefore, more amount of $(Cu,Ni)_6Sn_5$ than ever is present not only in the preformed solder but also in the solder bonded portion that is formed by using the preformed solder, so that the solder bonded portion having the better thermal conductivity than ever can be provided. At the time of melting the preformed solder to bond the parts to each other, because $(Cu,Ni)_6Sn_5$ is present in advance, melting of the solder alloy that is present around it can be facilitated owing to the superior thermal conductivity thereof. As a result, the flowability of the entire solder alloy is ensured during melting so that the solder bonded portion having generation of a void suppressed can be formed. Also, not only the melting point of $(Cu,Ni)_6Sn_5$ is 415° C., but also, contrary to $Cu_6Sn_5$, there is no η-η' phase change occurs at 186° C. The η-η' phase change causes the change in volume, resulting in concentration of the shear force to the solder bonded portion, which can cause a damage thereof. However, because no phase change occurs in $(Cu,Ni)_6Sn_5$, no phase change occurs even when the solder bonded portion is exposed to high temperature equal to or higher than 186° C. followed by cooling thereof; so, the concentration of the shear force to the solder bonded portion can be suppressed.

As described above, because the prescribed metal particle having $(Cu,Ni)_6Sn_5$ formed on the surface thereof is included or preferably dispersed, the characteristics of $(Cu,Ni)_6Sn_5$ with regard to the heat resistance and the thermal conductivity can be effectively given to the preformed solder as well as to the solder bonded portion. In addition, owing to the thermal conductivity thereof, generation of the void in the solder bonded portion can be suppressed. As a result, even when used as the solder bonded portion for a long period of time, the damage in bonding of the solder portion can be suppressed, so that the bonded portion having a higher reliability than ever can be provided. Also, the solder bonded body having the solder bonded portion having the characteristics as described above can be provided.

The lead-free solder is the metal alloy mainly composed of Sn; this may be any as far as Ni is included therein in accordance with the metal particle. Namely, when the metal particle is the prescribed Cu—Ni alloy, Ni is included in the metal particle; therefore, Ni is not essential in the solder alloy in order to form $(Cu,Ni)_6Sn_5$ on the surface of the metal particle. But, when the metal particle is the prescribed Cu—Co alloy, Ni is not included in the metal particle; therefore, it is necessary for the solder alloy to include Ni. There is no particular restriction in the lead-free solder alloy as far as the advantageous effects of the present invention can be expressed. When the metal particle is the prescribed Cu—Ni alloy, illustrative examples of the lead-free solder alloy include a Sn—Ag type, a Sn—Ag—Cu type, a Sn—Zn type, a Sn—Sb type, a Sn—Ag—Bi type, a Sn—Ag—In type, a Sn—Cu—Ni type, and a Sn—Ni type. Among these, the lead-free solder alloys of the Sn—Cu—Ni type and the Sn—Ni type are preferable. Also, to these lead-free solder alloys may be added, as appropriate, Ni, Co, Ge, Ga, Cr, P, Si, Ti, V, Mn, Fe, Zr, Nb, Mo, Pd, Te, Pt, Au, or the like. When the metal particle is the prescribed Cu—Co alloy, illustrative examples of the lead-free solder alloy include a Sn—Cu—Ni type and a Sn—Ni type, as well as lead-free solder alloys added with Ni to a Sn—Ag type, a Sn—Ag—Cu type, a Sn—Zn type, a Sn—Sb type, a Sn—Ag—Bi type, and a Sn—Ag—In type. Also, to these lead-free solder alloys may be added, as appropriate, Co, Ge, Ga, Cr, P, Si, Ti, V, Mn, Fe, Zr, Nb, Mo, Pd, Te, Pt, Au, or the like.

There is no particular restriction in the concentration of Sn in the lead-free solder alloy as far as Sn is a main component therein, namely, as far as the content of Sn in the lead-free solder alloy is the largest.

The metal particle is formed of the metal alloy of Cu and Ni, or the metal alloy of Cu and Co. When the metal alloy is formed of Cu and Ni, the content of Ni in the metal alloy is in the range of 0.1 to 90% by mass, preferably in the range of 5 to 45% by mass, and more preferably in the range of 10 to 40% by mass, while especially preferably in the range of 20 to 35% by mass. When the metal alloy is formed of Cu and Co, the content of Co in the metal alloy is in the range of 0.1 to 90% by mass, preferably in the range of 5 to 45% by mass, and more preferably in the range of 10 to 40% by mass, while especially preferably in the range of 20 to 35% by mass. In the case of the Cu—Ni alloy, when the content of Ni is within this range, or in the case of the Cu—Co alloy, when the content of Co is within this range, $(Cu,Ni)_6Sn_5$ is formed very quickly on the surface of the metal particle as the intermetallic compound, which is the compound between the lead-free solder alloy mainly composed of Sn and the metal particle.

The size of the metal particle may be any as far as the particle can serve as the nucleus in the formation of the intermetallic compound. For example, the average particle diameter thereof may be 5 μm or greater. The upper limit of the average particle diameter may be determined as appropriate in accordance with the distance between the parts to be bonded, the bonding strength of the solder, the members to be bonded, and the like. There is no particular restriction in the fluctuation of the particle; the particle may be sieved as necessary. There is no particular restriction in the shape of the metal particle; so, a heretofore known shape in this technical field may be used.

The content of the metal particle in the preform is not particularly restricted. This may be determined as appropriate on the basis of the relationship among the bonding strength as well as the heat resistance, the thermal conductivity, and the reliability expressed by the presence of the intermetallic compound, all of which are required in accordance with the use.

The metal particle as described above may be prepared by a heretofore known method. Alternatively, a commercially available product may be used as well.

$(Cu,Ni)_6Sn_5$ is formed on the surface of the metal particle. $(Cu,Ni)_6Sn_5$ may also be formed inside of the metal particle. When $(Cu,Ni)_6Sn_5$ is present at least on the surface of the metal particle, excellent heat resistance, thermal conductivity, and reliability can be given to the solder bonded portion. The metal particle as described above may be obtained as the metal particle having $(Cu,Ni)_6Sn_5$ dispersed in the solder alloy and formed on the surface thereof, for example, by cooling the mixture of the molten product of the prescribed solder alloy with the prescribed metal particle. Namely, this is formed at the time when the preformed solder is prepared.

There is no particular restriction in the shape of the preformed solder, so that the shape may be selected as appropriate in accordance with the use thereof and the like. Illustrative examples thereof include a sheet-like, a ribbon-like, a wire-like, a ball-like, a pellet, a washer, and other shape processed to an intended shape, but not limited to these.

The thickness of the preformed solder may be selected as appropriate in accordance with the use thereof and the like.

The preformed solder may be obtained by the method using a heating process with which $(Cu,Ni)_6Sn_5$ can be formed on the surface of the metal particle. For example, this may be obtained by the processes described below. (i) The prescribed metal particles are dispersed into or blended well with a flux agent; (ii) the metal particles having been blended with the flux agent are charged into a molten solder alloy, and then, uniformly dispersed; (iii) the resulting mixture is cooled to obtain an ingot before molding; and then, (iv) this is rolled by using a roll or the like to process to a prescribed shape or size. Note that at the process (i), the composition is adjusted such that the flux agent that is blended before having been changed to the ingot before molding may not be included in the preformed solder by being evaporated or decomposed at the process (ii). Alternatively, the preformed solder may be obtained by the mother alloy method that is described in Patent Literature 1.

The flux agent that is generally used in this technical field may be used. Examples thereof include the flux agent that includes a solvent or an activating agent. In addition, the flux agent may include a resin component such as a pine resin as needed. Illustrative examples of the solvent include ethyleneglycol monomethyl ether, ethyleneglycol monoethyl ether, ethyleneglycol monobutyl ether, diethyleneglycol monomethyl ether, diethyleneglycol monoethyl ether, 2-propanol, decanol, and isobornyl cyclohexanol (MTPH). Illustrative examples of the activating agent include adipic acid, succinic acid, maleic acid, benzoic acid, glutaric acid, and diethylaniline hydrobromic acid salt. Illustrative examples of the resin component include hydrogenated rosin, phenol-modified rosin ester, and polymerized rosin. The composition of the flux agent may be selected as appropriate by considering the composition of the solder alloy and the composition of the metal particle.

The sheet-like preformed solder according to the embodiment will be explained below with referring to the drawings. FIG. 1 is the sectional view that is cut-out in the thickness direction in order to explain the inner structure of the sheet-like preformed solder 1. As illustrated in FIG. 1, in the preformed solder 1, the metal particle 3 having $(Cu,Ni)_6Sn_5$ (reference sign 4) formed on the surface thereof is dispersed in the lead-free solder 2 that is formed of the metal alloy mainly composed of Sn. In the embodiment illustrated in FIG. 1, the metal particles 3 are dispersed in the solder 2. The metal particles 3 having $(Cu,Ni)_6Sn_5$ (reference sign 4) formed on the surface thereof are present closely to each other, so that the thermal conductivity due to $(Cu,Ni)_6Sn_5$ (reference sign 4) can be expressed more effectively. Therefore, it is presumed that, for example, the heat-releasing property in the solder bonded portion of the electronic part that works at high temperature is excellent thereby having the excellent heat resistance. Also, at the time of solder bonding, it is presumed that owing to the thermal conductivity thereof, melting by heating spreads instantly to the entire solder alloy thereby effectively suppressing generation of bubbles caused by the flow of the solder alloy, so that this, together with the characteristic of $(Cu,Ni)_6Sn_5$ (reference sign 4) in which the η-η' phase change does not take place, contributes to the increase in the reliability of the solder bonded portion after being cooled.

The solder bonded body according to the embodiment is the one that is formed by using the preformed solder described above. The solder bonded body includes a prescribed substrate and a solder bonded portion (also called solder layer) formed of the preformed solder that is bonded to the substrate. When the solder bonded body is formed by conducting the solder bonding using the preformed solder, this bonding may be effected by a reflow method or under a formic acid gas atmosphere, the methods heretofore known. Because the solder bonded body that is formed by the method as described above is formed by using the preformed solder, the bonded body has the solder layer that includes the metal particle having $(Cu,Ni)_6Sn_5$ formed on the surface thereof, so that this has the bonded portion having excellent heat resistance, thermal conductivity, and reliability.

As described above, because the preformed solder described above can form the solder bonded portion having excellent heat resistance, thermal conductivity, and reliability, this is extremely suitable for bonding of, for example, a power module to control driving of a car motor or other electric motors that generate a large heat.

EXAMPLES

The preformed solder according to the embodiment of the present invention will be explained on the basis of Examples.

Example 1

The flux agent including 1.2 parts by mass of a binder (isobornyl cyclohexanol), 0.4 part by mass of adipic acid, and 0.8 part by mass of decanol was mixed with 6.8 parts by mass of the metal powder of the Cu—Ni alloy containing 5.5 atm % of Ni (5.1% by mass) and 10.8 parts by mass of the lead-free solder alloy powder mainly composed of Sn (SN100C (registered trademark); the Sn—Cu—Ni type solder alloy, manufactured by Nihon Superior Co., Ltd.). The resulting mixture was melted by heating and then cooled to obtain the sheet-like preformed solder 1.

Evaluation 1

Figure 2:
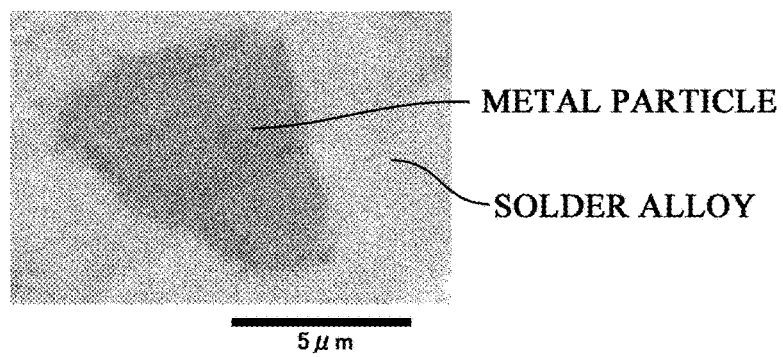
FIG. 2 is an image, taken by SEM, of a part of the section in the thickness direction of the preformed solder that is obtained in Example.

The section in the thickness direction of the preformed solder 1 thus obtained was confirmed by SEM. The preformed solder was formed by using the metal particle whose Cu concentration was high with the Ni content of 5.1% by mass, but as can be seen in FIG. 2, it was confirmed that the metal particle was retained in the solder alloy. Namely, it is presumed that Sn was dispersed to the metal particle of the Cu—Ni alloy to form $(Cu,Ni)_6Sn_5$ on the surface thereof.

Example 2

Preparation of Foil 1 of Lead-Free Solder

The foil 1 having the width of 15 mm, the length of 15 mm, and the thickness of 2.5 mm was prepared by the usual method using the solder alloy composed of 0.7 Cu, 0.05 Ni, 0.005 Ge, and the balance (SN100C (registered trademark); manufactured by Nihon Superior Co., Ltd.).

Production of Preformed Solder

The metal particle of the Cu—Ni alloy containing 30% by mass of Ni was kneaded with the flux agent (Flux RM-5; manufactured by Nihon Superior Co., Ltd.) such that the content thereof might become the value described in Table 1 under the state of the preformed solder to obtain the kneaded product. Next, this kneaded product was uniformly applied to the central portion of one surface of the solder foil 1 so as to give the width of 10 mm and the length of 10 mm. Then, the solder foil 1 having the kneaded product coated on the surface was put on the hot plate whose temperature was kept at 200° C. to heat the solder foil 1, and at the same time, a soldering iron (temperature of the iron tip: 350° C.) was contacted to it from the side of the surface coated with the kneaded product to melt the front surface layer of the solder foil 1 to embed the metal particle of the Cu—Ni alloy into the alloy of the solder foil 1. Then, after natural cooling, the solder foil 2 having the metal particle included in the lead-free solder alloy was obtained. Both the front and back surfaces of the solder foil 2 were polished and processed to the thickness of 2 mm, the width of 10 mm, and the length of 10 mm to obtain the sheet-like preformed solder 2 as the solder foil 3. The preformed solder 2 thus obtained was used as the sample for evaluation.

Comparative Example 1

After the surface of the solder foil 1 was polished to the thickness of 2 mm, this was cut to the width of 10 mm and the length of 10 mm to obtain the solder foil 4. The solder foil 4 thus obtained was used as the sample for evaluation.

Evaluation 2

Measurement of Thermal Diffusivity

The thermal diffusivity of each sample of Example 2 and Comparative Example 1 having been blackening-processed by using DGF (manufactured by Nippon Senpaku Kogu KK), the lubricant for formation of an aerosol-drying type graphite film, was measured at room temperature in an atmosphere by using the laser flush analyzer LFA457 (manufactured by NETZSCH GmbH).

Measurement of Density

In accordance with the Archimedes method, each sample of Example 2 and Comparative Example 1 was sunk into water in the container whose inner diameter is the same as that of the sample; then, the volume of the sample was measured by the change in the liquid level before and after sinking of the sample. The density thereof was calculated from the sample weight.

Measurement of Specific Heat

The specific heat of each sample of Example 2 and Comparative Example 1 was measured by using sapphire as the standard substance under an argon atmosphere at room temperature with the DSC method using the differential scanning calorimeter DSC3500 (manufactured by NETZSCH GmbH).

Thermal Conductivity

The thermal conductivity of each sample of Example 2 and Comparative Example 1 was calculated by using the following formula from the thermal diffusivity, the density, and the specific heat, which were obtained as described above.

Thermal Conductivity (W/(m·K))=Thermal Diffusivity ($m^2$/s)×Density (Kg/$m^3$)×Specific Heat (J/(Kg·K))

The results are listed in Table 1.

TABLE 1

| Sample | Solder alloy | Metal particle content [wt %] | Density [×$10^3$ Kg/$m^3$] | Specific heat [J/ (Kg · K)] | Diffusivity [×$10^{-6}$ $m^2$/s] | Thermal conductivity [W/ (m · K)] |
|---|---|---|---|---|---|---|
| Example 2 | SN100C | 1 | 7.4 | 219 | 42 | 68.1 |
| Comparative Example 1 | | — | 7.4 | 219 | 41.4 | 67.1 |

As described in Table 1, it can be seen that the thermal conductivity is increased by including the prescribed metal particle.

Example 3

Figure 3:
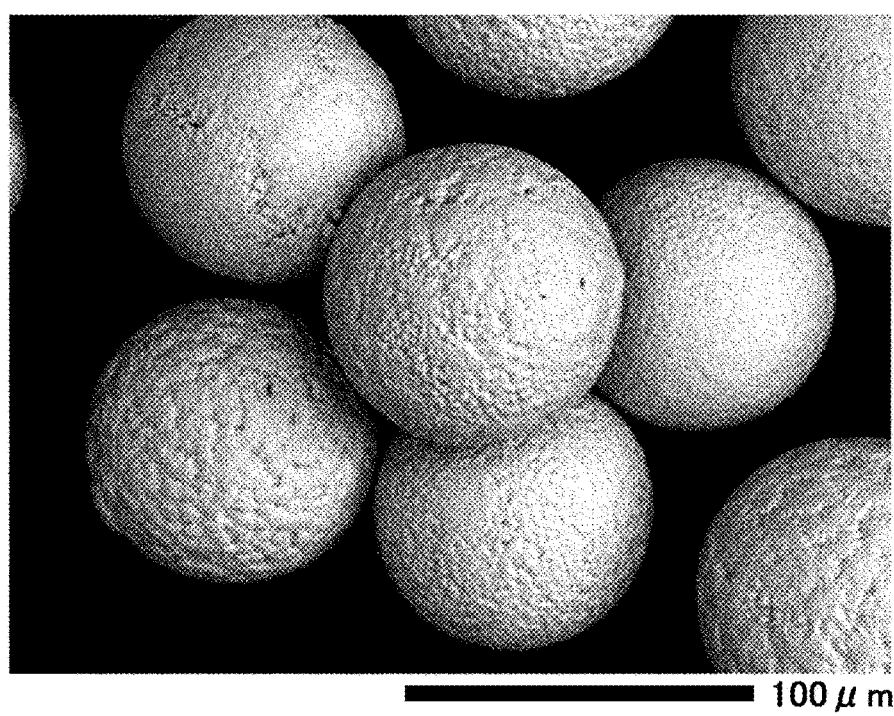
FIG. 3 is an image, taken by the scanning electron microscope, of the appearance of the metal ball of the Cu—Co alloy that is used in Example 3.

The preformed solder 3 was obtained by using the same manner as Example 2 except that the metal particle of the Cu—Co alloy whose Co content was 30% by mass was used (average particle diameter of 85 μm, spherical shape, see FIG. 3).

Evaluation 3

Observation of Sectional Structure of Solder Bonded Body

Figure 4:
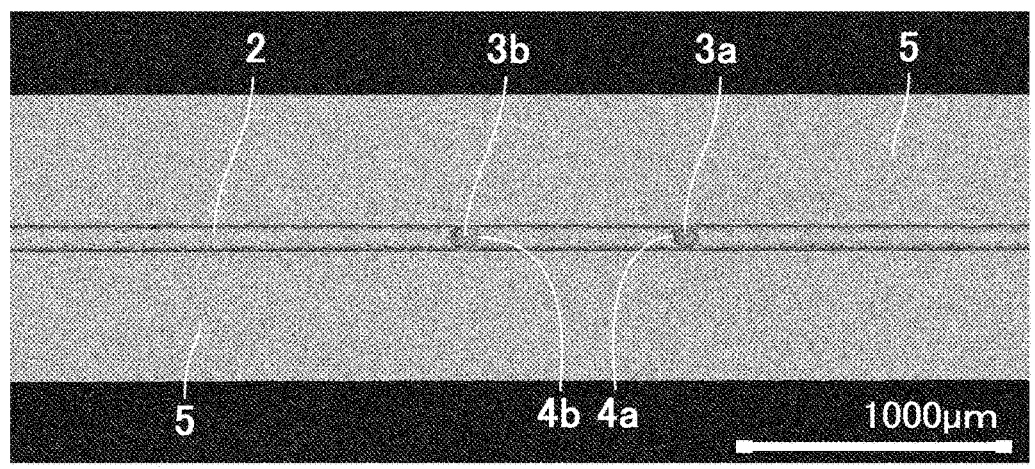
FIG. 4 is an image, taken by the digital microscope and the scanning electron microscope, of the sectional structure of the solder bonded body that is formed by arranging the preformed solder according to Example between the copper foil substrates followed by heating thereof.
Figure 5:
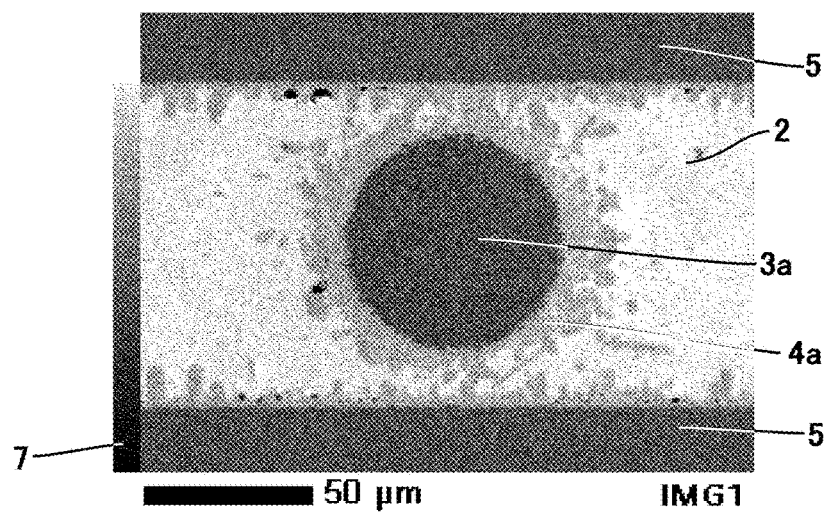
FIG. 5 is an image of an enlarged part around the metal particle illustrated by the reference sign 3a in FIG. 4.
Figure 6:
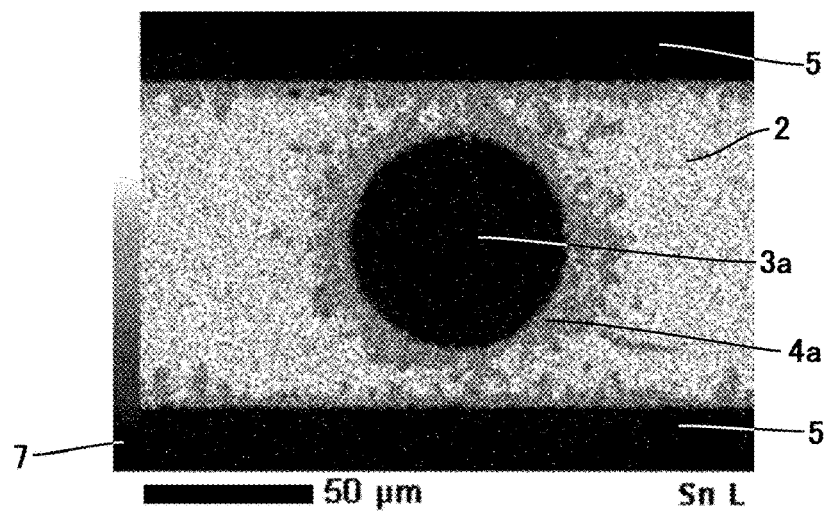
FIG. 6 is an image illustrating distribution of Sn in the part displayed in FIG. 5, obtained by the metal component analysis with the energy dispersive X-ray analyzer.
Figure 7:
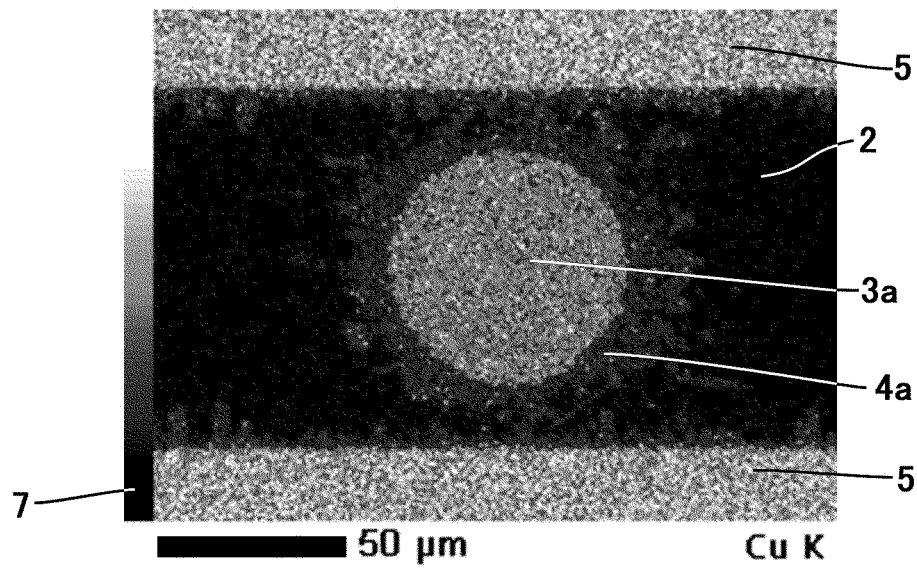
FIG. 7 is an image illustrating distribution of Cu in the part displayed in FIG. 5, obtained by the metal component analysis with the energy dispersive X-ray analyzer.
Figure 8:
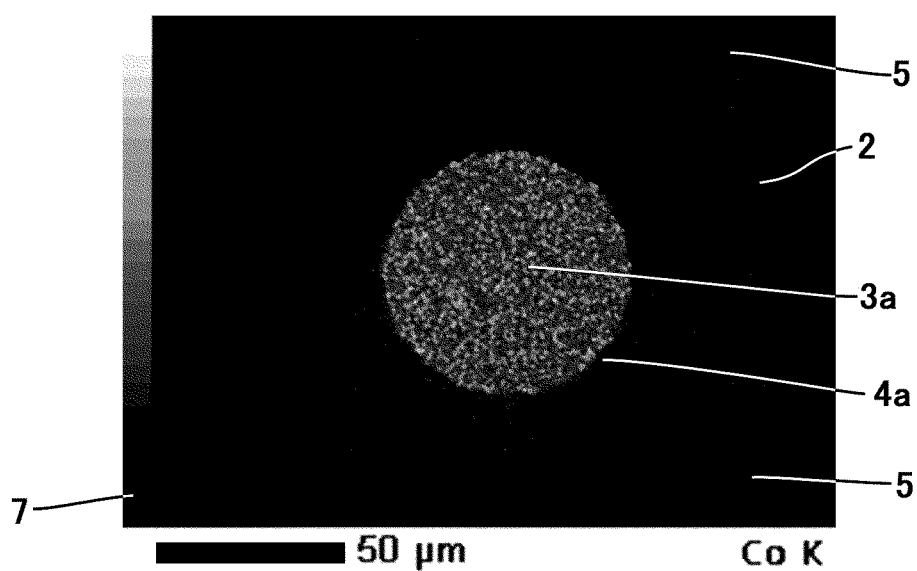
FIG. 8 is an image illustrating distribution of Co in the part displayed in FIG. 5, obtained by the metal component analysis with the energy dispersive X-ray analyzer.

The preformed solder 3 thereby obtained was interposed between two copper foil substrates; then, this was heated by a usual method at 250° C. for 1 to 2 minutes to melt the preformed solder 3. After this was cooled, the solder bonded body in which both the copper foils were bonded via the solder bonded portion of the preformed solder 3 was obtained. The section in the thickness direction of the solder bonded body thereby obtained was photographed by the digital microscope and the scanning electron microscope (SEM) to observe the section. By using the image processing software, the layer thickness of the preformed solder 3 and the size of the metal particle covered with the intermetallic compound included in this layer were measured. The images thus obtained are illustrated in FIG. 4 and FIG. 5. FIG. 5 is an enlarged view (700 folds) of the metal particle designated by the reference sign 3a in FIG. 4 and its vicinity. The metal component analysis was conducted in the section in the thickness direction of the bonded body illustrated in FIG. 5 by using the energy dispersive X-ray analyzer to measure the distribution of Sn, Cu, and Co. The measurement results are illustrated in FIG. 6 to FIG. 8. The metal component analysis was conducted with the simplified quantitative analysis by the ZAF method and under the condition with the fitting coefficient of 0.7108, the acceleration voltage of 20.0 kV, and the irradiation current of 1.00000 nA. FIG. 6 to FIG. 8 illustrate the distribution of Sn, Cu, and Co, respectively in the section in FIG. 5. Note that FIG. 6 to FIG. 8 are illustrated by white and black colors, but the actual pictures illustrate the concentration distribution with the colored points. The indicator designated by the reference sign 7 in FIG. 6 to FIG. 8 indicates in the order of blackish, bluish, yellow-greenish, and reddish from the bottom to the top in the respective colored images, in which the spectrum is arranged in the order that the upper side in the picture becomes a pale color. Also, the indicator 7 is arranged such that the concentration is higher from the bottom to the top. In the below explanation with referring to FIG. 6 to FIG. 8, the display in the colored image is expressed by using the brackets as needed.

As illustrated in FIG. 4 and FIG. 5, it can be seen that the intermetallic compound (($Cu,Ni)_6Sn_5$) 4a and 4b are formed around the metal particles 3a and 3b. The thickness of the solder alloy 2 was uniformly 96 μm near to both the ends of FIG. 4 and FIG. 5, and the whole size of the metal particle 3a surrounded by the intermetallic compound 4a was about 85 μm, and the whole size of the metal particle 3b surrounded by the intermetallic compound 4b was about 87 μm. Namely, it is presumed that contrary to the case of the metal particle of solely Cu or Ni, the Cu—Co particle retains the shape thereof, thereby expressing the function to form the solder alloy 2 having the uniform layer thickness.

Also, as illustrated in FIG. 6, it was found that Sn was not included in the metal particle 3a and in the copper foil 5 (black), and included with high concentration in the solder alloy 2 (reddish color, especially pale color is distributed more), and included with about the intermediate concentration of these two near the interface of the solder alloy 2 with the copper foil 5 and with the metal particle 3a (yellow-greenish is more with some bluish). The distribution of Cu is somewhat unclear in the white and black picture in FIG. 7, but when referred to the corresponding color picture, Cu is included much in the copper foil 5 (reddish color is distributed more), and less in the metal particle 3a as compared with the copper foil 5 (reddish and yellow-greenish colors are distributed to nearly the same degree), and hardly included in the solder alloy 2 (blackish), and less than about the intermediate of these two near the interface between the solder alloy 2 with the copper foil 5 and with the metal particle 3a (bluish color is distributed more). It was found that Co was included only in the metal particle 3a (pale blue color is distributed more), as can be seen in FIG. 8.

As described above, from FIG. 4 to FIG. 8, when the metal particle of the prescribed Cu—Co alloy is included, the metal article covered with the intermetallic compound $(Cu,Ni)_6Sn_5$ is present between the substrates such as the copper foil in the solder alloy with retaining the particle diameter thereof; thus, the distance between the substrates can be kept at constant, thereby contributing to the increase in the reliability. In addition, for example, in Examples here, the metal particle covered with $(Cu,Ni)_6Sn_5$ continues to the intermetallic compound formed on the surface of the substrate such as the copper foil, thereby contributing to the increase in the thermal conductivity. Accordingly, it may be expected that even when the metal particle of the prescribed Cu—Co alloy is included, similarly to the case of the metal particle of the prescribed Cu—Ni alloy, the preformed solder capable of forming the bonded portion having heat resistance, thermal conductivity, and reliability higher than ever as well as the solder bonded body having the solder bonded portion with the excellent characteristics as mentioned above can be provided.

REFERENCE SIGNS LIST

1 Sheet-like preformed solder
2 Solder alloy
3, 3a, 3b Metal particle
4, 4a, 4b $(Cu,Ni)_6Sn_5$
5 Copper foil (substrate)

The invention claimed is:

1. A solder preform comprising:
a lead-free solder mainly comprising Sn, and
metal particles with a melting point higher than a melting point of the lead-free solder, wherein:
the lead-free solder contains Ni,
(Cu,Ni)6 Sn5 is formed on a surface of the metal particles, and
the metal particles consist of Cu—Co, have a Co content of 10 to 40% by mass,
and have an average particle diameter of 5 μm or greater.

2. The solder preform of claim 1 wherein the lead-free solder is a Sn—Cu—Ni solder.

3. The solder preform of claim 1 wherein the Co content is 20 to 35% by mass.

* * * * *